INVENTORS
ANTHONY R. EAMES
JOSEPH K. BUTLER

BY Larson and Taylor

ATTORNEYS

INVENTORS
ANTHONY R. EAMES
JOSEPH K. BUTLER

BY *Larson and Taylor*

ATTORNEYS 3,325,728
APPARATUS FOR SENSING VARIATIONS IN THE ELECTRICAL RESISTIVITY OF A LIQUID FLOW DUE TO THE PRESENCE OF PARTICLES
Anthony Rainsford Eames, Stockton Heath, near Warrington, England, and Joseph Kenneth Butler, Thurso, Caithness, Scotland, assignors to United Kingdom Atomic Energy Authority, London, England
Filed Nov. 7, 1962, Ser. No. 236,055
Claims priority, application Great Britain, Nov. 10, 1961, 40,272/61
4 Claims. (Cl. 324—65)

This invention relates to apparatus for indicating the metal oxide content of a liquid metal.

The indication of the metal oxide content of a liquid metal is particularly important in the operation of a nuclear reactor the core of which is cooled by a liquid metal coolant. Metal oxide in the coolant can lead to corrosion of materials which are not corroded by the liquid metal itself.

One way of obtaining an indication of the metal oxide content of a liquid metal is to pass the liquid metal through a pipe formed with a constriction and, by progressively cooling the liquid metal, to determine the temperature at which flow through the constriction is blocked by precipitated metal oxide particles. This so-called "plugging" temperature provides a basis for estimating the saturation temperature of the liquid metal. By reference to tables of solubility data concerning solutions of metal oxide in metal, the metal oxide content can then by estimated. However, the saturation temperature derived in this way tends to be inaccurate because flow through the constriction is not blocked immediately upon the commencing of precipitation but only after a considerable mass of metal oxide has been precipitated. Consequently the relationship of plugging temperature to saturation temperature is generally indefinite.

An adaptation of this method of measuring the metal oxide content of a flowing liquid metal which has been proposed (see for example page 72 of Nucleonics, vol. 19, No. 5—May 1961) comprises progressively cooling the liquid metal while simultaneously measuring its electrical resistivity, detecting changes of its resistivity characteristic of the presence of metal oxide particles, and measuring the temperature at which the presence of particles is first detected. It is an object of the present invention to provide apparatus facilitating the detection of changes in liquid metal resistivity characteristic of the presence of metal oxide particles.

According to the present invention, there is provided apparatus for measuring small changes of electrical resistivity of flowing liquid metal due to the presence of metal oxide particles in the liquid metal stream and comprising a closed loop pipe with opposed inlet and outlet connections, an induction coil electromagnetically linked with the loop pipe to induce on energization with alternating current a flow of alternating current in the liquid metal flowing in the loop pipe, a probe coil also electromagnetically linked with the loop pipe to derive a voltage signal due to the alternating current in the loop pipe and representative of the resistivity of the liquid metal, and a discriminator to eliminate from the resistivity signal fluctuations having a period non-commensurate with the transmit time of particles in the loop pipe. Preferably the discriminator has means whereby the period of the fluctuations to be displayed can be adjusted to allow for varying rates of liquid metal flow.

A rhometer is an apparatus for measuring small changes of electrical resistivity in flowing liquid metals and is fully described in the article by Blake et al. in Nucleonics, vol. 19, May 1961, the rhometer therein described being the subject of U.S. Patent 3,078,412. It is sufficient here to state that the rhometer comprises means to cause the passage of an alternating current trough liquid metal in a pipe, means to derive a test voltage dependent upon the current passing through the liquid metal, and means to derive a signal representative of the resistivity of the liquid metal by combining the test voltage with a reference voltage derived from a standard resistance through which is passed a current related to the current passed through the liquid metal, the standard resistance having the same thermal coefficient of resistivity as the liquid metal and being maintained in thermal contact with the liquid metal.

Embodiments of apparatus according to the invention will now be described by way of example with reference to the accompanying drawings in which.

Figure 1:
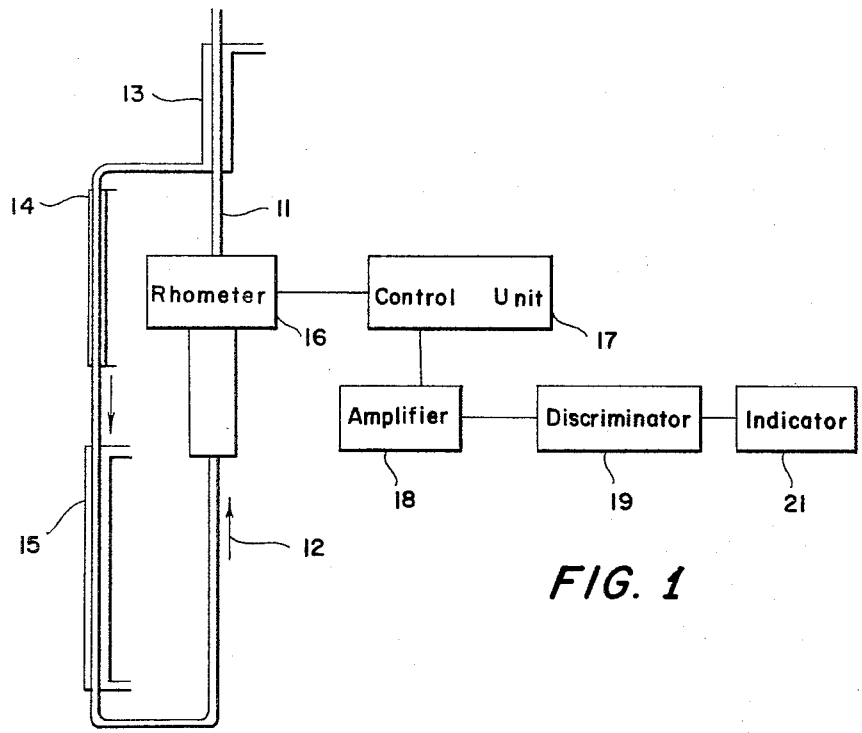
FIGURE 1 shows a block diagram of one embodiment.

In FIGURE 1 there is shown a pipe loop 11 through which liquid sodium flows in the direction of the arrow 12. The loop is included in the coolant circuit for a fast nuclear reactor employing liquid sodium as a coolant. The liquid sodium flows through the loop and passes through a heat exchanger 13, a heater 14, a cooler 15 and a rhometer 16. The rhometer is an apparatus for measuring small changes of electrical resistivity in flowing liquid metals and is fully described in the aforementioned article. In a control unit 17 which is electrically connected to the rhometer there is generated an alternating signal representative of the resistivity of the liquid metal flowing through the rhometer. This signal is amplified in an amplifier 18. A discriminator 19 selects fluctuations in the amplified signal which have a period commensurate with the time taken for a metal oxide particle to flow through the rhometer. A metal oxide particle causes a fluctuation in the resistivity signal by temporarily increasing the resistivity measured by the rhometer.

Figure 2:
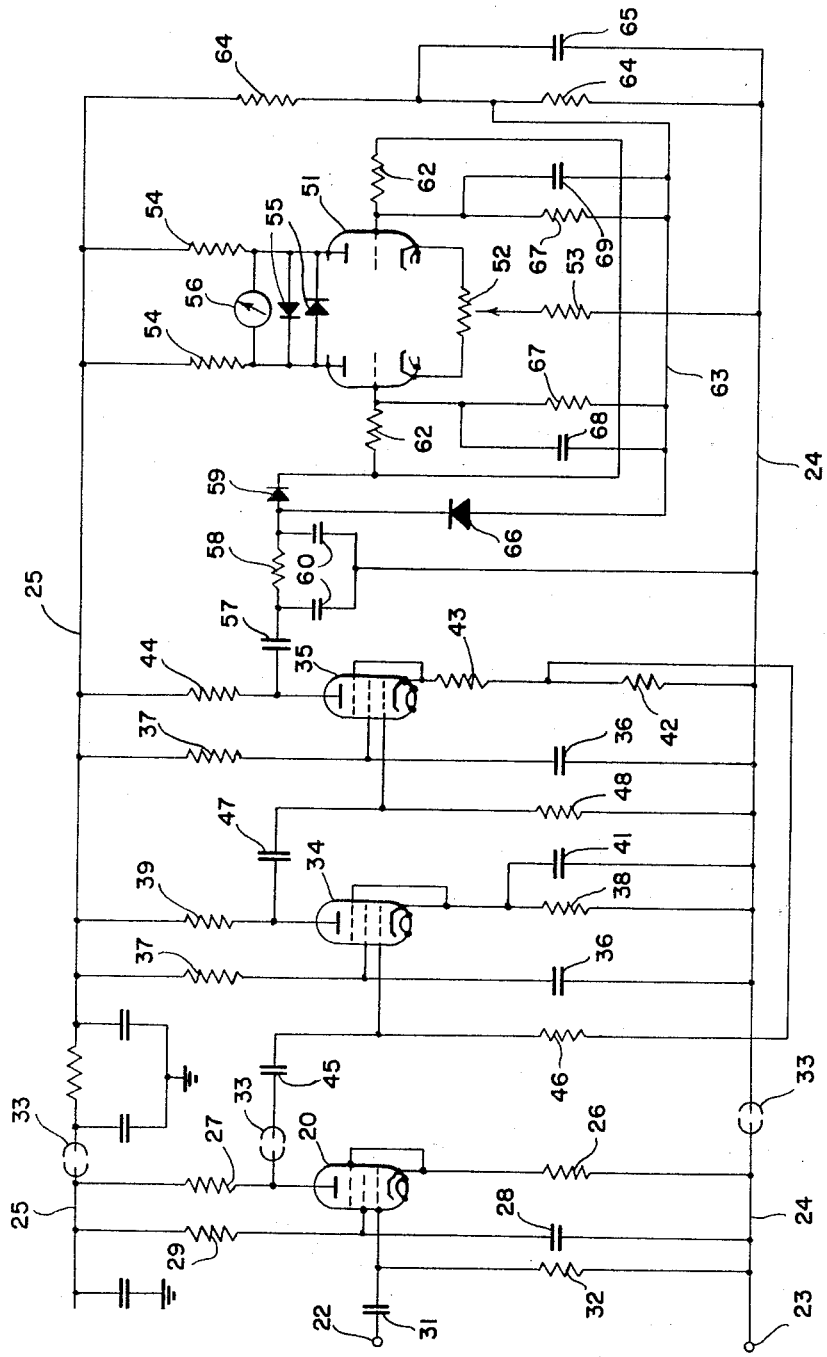
FIGURE 2 shows a diagram of the circuit of part of the embodiment of FIGURE 1.

The circuit diagram of the amplifier 18, discriminator 19 and indicator 21 is shown in FIGURE 2. The alternating signal from the control unit 17 is fed into a head amplifier at input terminals 22 and 23. The head amplifier incorporates a pentode 20 (6BR7) connected between a low potential line 24 and a high potential line 25 by resistors 26 (1200Ω) and 27 ( 270KΩ) connected in the cathode and anode circuits respectively. The heater of the pentode is connected to a 25 volt D.C. stabilised supply (not shown). The suppressor of the pentode 20 is connected to the cathode and the screen of the pentode is connected between the lines 24 and 25 by a capacitor 28 (25 μf.) and a resistor 29 (1.2MΩ) respectively. The alternating signal at the input terminals 22, 23 is applied to the grid of the pentode, the terminal 22 being connected to the grid through a coupling capacitor 31 (0.5 μf.) and the terminal 23 being connected with the low potential line 24. A grid leak resistor 32 (1MΩ) is connected between the grid and the line 24. The heat amplifier is located near the control unit 17 but may be at a distance from the remainder of the amplifying and detecting circuit, as is shown diagrammatically by the broken couplings 33.

The amplified signal from the head amplifier is fed through a resistance-capacitance coupling to a two-stage main amplifier incorporating pentodes 34 and 35 (both E180F). The suppressors of both pentodes 34, 35 are connected to their cathodes, the screens of both pentodes are connected between lines 24 and 25 by capacitors 36 (8 µf.) and resistors 37 (47KΩ) respectively, and the heaters of the pentodes are connected in series with the aforementioned stabilised D.C. supply. The pentode 34 is connected between the lines 24 and 25 by means of a resistor 38 (100Ω) in the cathode circuit and the resistor 39 (10KΩ) in the anode circuit; since the pentode 34 is cathode biassed, a capacitor 41 (50 µf.) is connected across the resistor 38. Similarly the pentode 35 is connected between the lines 24 and 25 by means of two resistors 42 and 43 (both 100Ω) in the cathode circuit and resistor 44 (15KΩ) in the anode circuit. The output signal from the head amplifier is applied to the grid of the pentode 34 through a coupling capacitor 45 (0.5 µf.). A grid leak 46 (100KΩ) is connected between the grid of pentode 34 and a point between resistors 42 and 43 in the cathode circuit of pentode 35. The output from the pentode 34 is fed through a resistance-capacitance coupling to the grid of the pentode 35; the coupling comprises a coupling capacitor 47 (0.5 µf.) and a grid leak resistor 48 (100KΩ).

A discriminator incorporates a double triode vacuum tube 51 (ECC83) having its cathodes connected through a resistor 52 (10KΩ); a variable tapping on the resistor 52 is connected through a resistor 53 (150KΩ) to the line 24 thereby completing the cathode circuit of the valve 51. The anodes of the double triode are connected in parallel through resistors 54 (4.7KΩ) to the line 25. Two diodes 55 (OA5) and an ammeter 56 (0–25 µa.) are connected across the anodes of the double triode. The heaters of the double triode are connected in series with the aforementioned stabilised D.C. supply.

The output from the main amplifier is fed through a coupling capacitor 57 (0.5 µf.), a resistor 58 (100KΩ) and a rectifying diode 59 (1S115). Two capacitors 60 (.01 µf.) are connected between both ends of the resistor 58 and the line 24 of the output of the main amplifier. The rectified output from the diode 59 is applied to the grids of the double triode through resistors 62 (1MΩ). A line 63 is connected between the diode 59 and a point between two resistors 64 (220KΩ) connected across the lines 24 and 25 so that it derives a potential intermediate the potentials of the lines 24 and 25. A capacitor 65 (200 µf.) is also connected between the line 63 and the line 24. A diode 66 (1S115) is so connected in the line 63 that in the forward direction it conducts towards the diode 59.

A delay coupling comprising a resistor and a capacitor in parallel is connected between each grid of the double triode and the line 63. The delay couplings are arranged to have different time constants, thus in both couplings the resistors 67 (1MΩ) are of equal value but in one coupling the capacitor 68 (.25 µf.) has a smaller value than the capacitor 69 (8 µf.) of the other coupling. While the signal applied to the grids of the double triode is of constant amplitude, there is no difference between the voltage at the two anodes. However, if the signal amplitude alters sufficiently quickly the delay couplings with different time constants unbalance the double triode, so that a potential difference between the two anodes occurs and is displayed on the indicator 56.

The delay couplings are arranged to have time constants such that fluctuations in the applied signal which have a period greater than a predetermined value dependent upon the rate of flow of the liquid metal do not cause an indication on the indicator. In this way the discriminator is adapted to display only those fluctuations having a period commensurate with the time taken for a metal oxide particle to flow through the rhometer.

This arrangement enables a small fluctuation in the amplitude of the signal to be displayed over a wide range of amplitudes. It is found that a visible deflection on the indicator 56 is caused by a 60 mv. signal fed into the detector. However, the amplification of the input signal before it is fed into the detector is $10^4$ so that a fluctuation of 6 µv. in the amplitude of the input signal is visible on the indicator.

In a measurement of the concentration of metal oxide in liquid metal flowing through the rhometer, the liquid metal is cooled until the precipitation temperature of the metal oxide solution is reached. The temperature at which precipitation occurs is indicated by the rhometer in combination with the discriminator which displays the presence of metal oxide particles as soon as the liquid metal is cool enough for their formation and this temperature is measured, for example by a thermocouple. The saturation temperature can be ascertained accurately from the precipitation temperature so that the concentration of oxide can be ascertained by reference to tables of solubility data. Such a measurement of the concentration of metal oxide affords a convenient method of calibrating a rhometer; thereafter the resistivity of the liquid metal, as indicated by the rhometer, may be used as a direct measurement of the concentration of metal oxide in the liquid metal.

It is to be understood that this invention is not limited to the details of the foregoing example, for instance it is envisaged that the delay couplings could have adjustable time constants so that for various rates of flow of liquid metal through the rhometer the discriminator could be adjusted to select and display fluctuations having the appropriate period.

Figure 3:
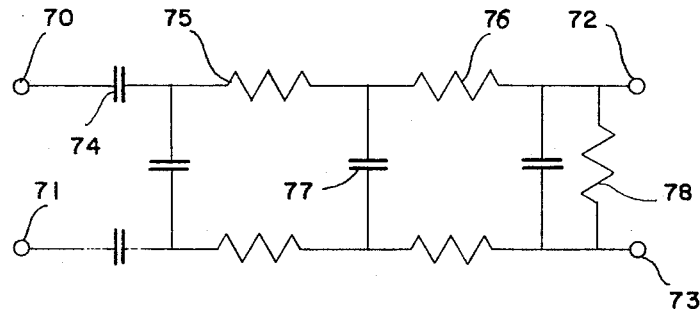
FIGURE 3 is a circuit diagram of a modification.

The alternative of FIG. 3 is based on the use as the discriminator of a filter constituted by a common node rejection amplifier effective to reject fluctuations in the resistivity signal having a frequency outside a pre-selected frequency band and thus to pass to an indicator only those fluctuations having a period commensurate with the time taken for a metal oxide particle to pass through the rhometer. The filter as illustrated, besides replacing the discriminator portion of FIG. 2, is to be understood to be interposed between the control unit 17 (FIG. 1) and the amplifier, and therefore, at input terminals 70 and 71, it receives directly the alternating signal from the control unit. Disposed in series between each input terminal and respectively corresponding output terminals 72 and 73 are a capacitor 74 (100 µf.) and two resistances 75 and 76 (500KΩ each), there being three cross connecting capacitors such as 77 (0.3 µf. each). Across the output terminals is a resistance 78 (1MΩ) to equalise the resistive load. The indicated values of these several components result in rejection of signals at a frequency 10 c.p.s. so that only fluctuations of a lesser frequency would then be displayed.

What we claim is:

1. In an apparatus for measuring fluctuations of electrical resistivity of metal oxide particles in a liquid metal stream flowing through a closed loop pipe, the combination of an induction coil electromagnetically linked with the loop pipe and connected to an alternating current source, a probe coil electromagnetically linked with the loop pipe, and a discriminator means connected to said probe coil to receive an output signal therefrom and having a rejection characteristic for fluctuations in a signal having a period non-commensurate with the transit time of metal oxide particles entrained in a liquid metal stream in said loop pipe.

2. In an apparatus as claimed in claim 1 wherein said discriminator means has means for adjusting the period of the fluctuations to be passed by the discriminator means to allow for varying rates of liquid metal flow.

3. In an apparatus as claimed in claim 1 wherein said discriminator means has a filter of capacitors and resistors adapted to pass only those fluctuations having a frequency within a preselected frequency band.

4. In an apparatus as claimed in claim 1 wherein said discriminator means comprises two parallel delay couplings of differing time constants through which resistivity signals are passed and a difference amplifier connected to said couplings to amplify any difference between resistivity signals issuing from said two delay couplings.

References Cited

UNITED STATES PATENTS

| | | | |
|---|---|---|---|
| 2,656,508 | 10/1953 | Coulter | 324—71 |
| 2,782,369 | 2/1957 | Werner et al. | 324—65 |
| 3,078,412 | 2/1963 | Blake | 324—30 X |

OTHER REFERENCES

Blake et al.: "Electrical-Resistivity Meter Monitors Oxygen Content of Liquid Metals." Nucleonics, vol. 19, No. 5, May 1961, pp. 66, 68, 70, and 72.

RUDOLPH V. ROLINEC, *Primary Examiner.*

WALTER L. CARLSON, FREDERICK M. STRADER, *Examiners.*

C. F. ROBERTS, *Assistant Examiner.*